Oct. 4, 1938.                M. O. JOHNSTON                2,132,072
                             FORMATION TESTER
                           Filed July 1, 1935            2 Sheets-Sheet 1
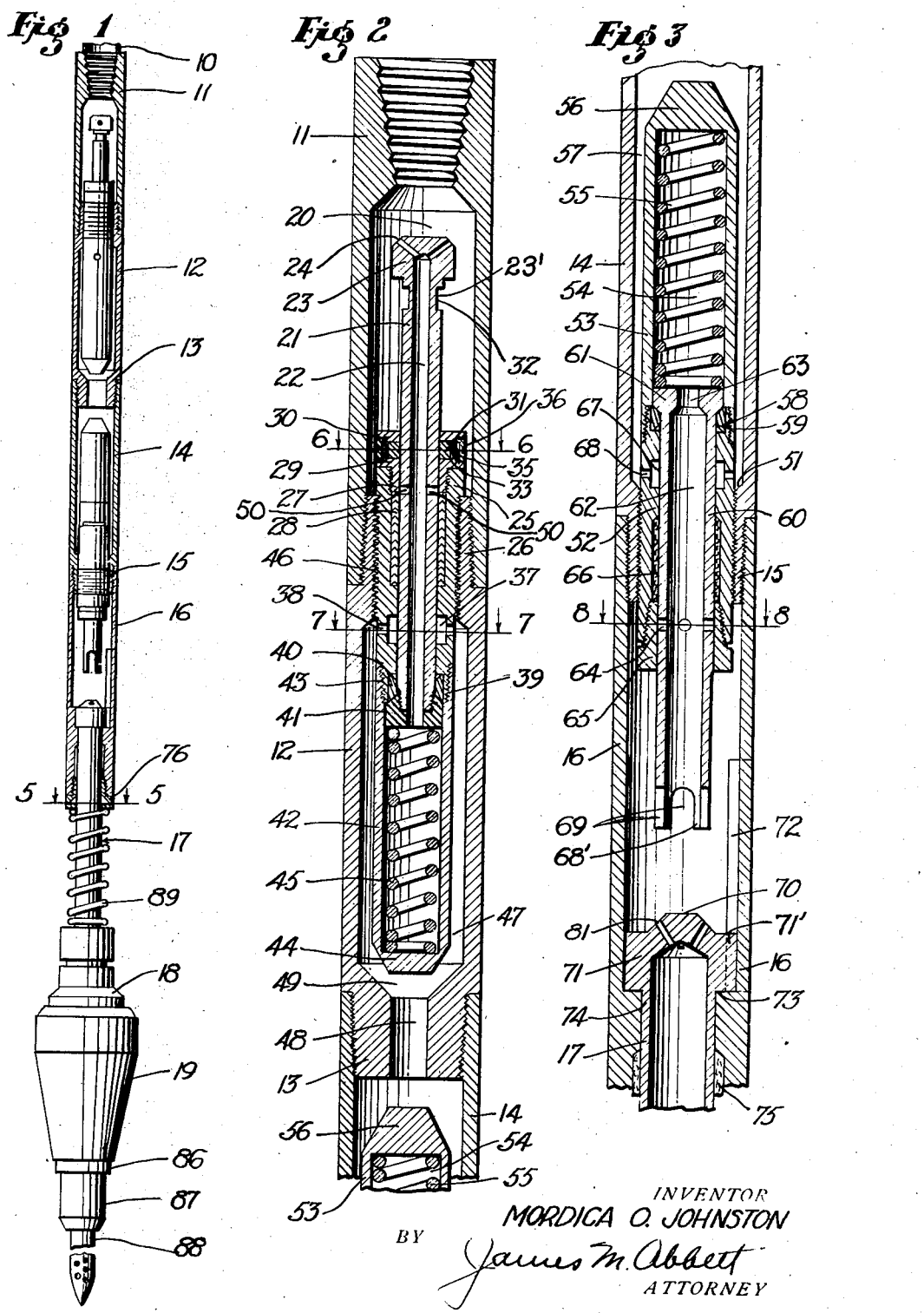
INVENTOR
MORDICA O. JOHNSTON
BY James M. Abbett
ATTORNEY Oct. 4, 1938.     M. O. JOHNSTON     2,132,072
FORMATION TESTER
Filed July 1, 1935     2 Sheets-Sheet 2
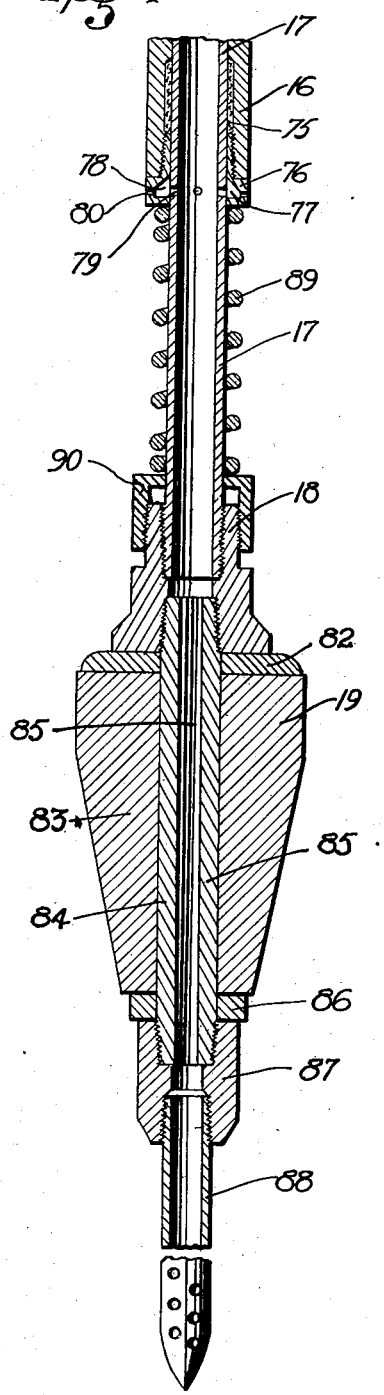
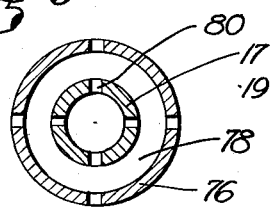
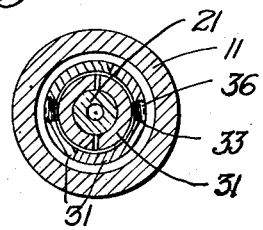
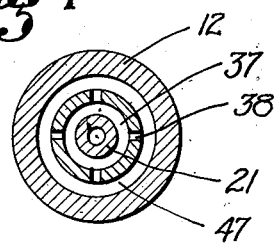
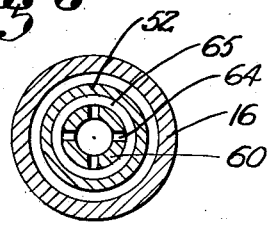
INVENTOR
MORDICA O. JOHNSTON
BY James M. Abbett
ATTORNEY Patented Oct. 4, 1938

2,132,072

UNITED STATES PATENT OFFICE 2,132,072

FORMATION TESTER

Mordica O. Johnston, Los Angeles, Calif.

Application July 1, 1935, Serial No. 29,198

6 Claims. (Cl. 166—1)

This invention relates to oil well tools and particularly pertains to a formation tester.

In the drilling and production of oil wells it is now common practice to test the well from time to time as the drilling progresses in order to ascertain the character of the fluids present within the formation being penetrated. It is also common practice to test the casing after it has been set to ascertain whether or not the lower end of the casing has been properly landed and cemented at the bottom of the well bore. In early methods of carrying out these tests it was necessary to bail the bore or casing and thereafter obtain samples from the formation at a given level or to ascertain whether or not the casing was leaking. In recent years, however, such tests have been made by lowering a testing tool into the well without removing the liquids present, and then packing off a column of liquid within the well above the testing tool from the space below the testing tool so that a sample of the fluid might be withdrawn from this space and its character and volume thereafter readily ascertained. Due to the fact that the testing tool must be manipulated at a point of great depth below ground it is necessary to provide a tool which will be positive in its operation so that it can be ascertained with certainty that the formation has been packed off from the column of fluids within the well, and so that it will be known with assurance that the sample chamber has been positively opened and positively closed while making the test. In this manner the presence or absence of fluid within the testing chamber will be a direct index to the character of fluid in the formation.

It is the principal object of the present invention therefore to provide a testing tool adapted to be lowered into a well bore on a drill string and to be manipulated so as to set a packer within the hole and to open and close the necessary valves to establish communication between a sample chamber and the area being tested, and to interrupt the sample within the sample chamber when a test has been made. It is another object of the present invention to provide a testing tool, all of the operations of which are brought about by direct longitudinal movement of the various valve parts of the tool without requiring any rotation of the drill string to open or close the valves, or otherwise manipulate the parts thereof, thus insuring that the tool will be positive in its operation and that the condition of the sample chamber with the presence or absence of fluid contents therein will correctly indicate the condition of the formation being tested, whether the result is a positive one or a negative one. It is a further object of the present invention to provide a testing tool of the character described which may be used readily in well casings to make water shut-off tests.

The present invention contemplates the provision of a well testing tool having a packer at its lower end, bypass and equalizer valve structures intermediate its ends, a main valve adapted to be opened and closed by manipulation of the drill string supporting the tester, and a trip valve adapted to be positively opened and thus held when a sample is to be taken.

The invention is illustrated by way of example in the accompanying drawings in which:

Figure 1 is a view in central longitudinal section showing the assembled tool with which the present invention is concerned.

Fig. 2 is an enlarged view in central longitudinal section showing the trip valve structure at the top of the testing tool.

Fig. 3 is an enlarged view in central longitudinal section showing the main valve structure.

Fig. 4 is an enlarged view in central longitudinal section showing the packer and bypass valve.

Fig. 5 is a view in transverse section through the bypass valve as seen on the line 5—5 of Fig. 1.

Fig. 6 is a view in transverse section showing the lock means for the trip valve as seen on the line 6—6 of Fig. 2.

Fig. 7 is a view in transverse section showing the ducts leading to the trip valve, as seen on the line 7—7 of Fig. 2.

Fig. 8 is a view in transverse section showing the fluid ducts leading to the main valve as seen on the line 8—8 of Fig. 3.

Referring more particularly to the drawings, 10 indicates a drill string by which the testing tool is supported in a well. The lower end of the drill string 10 is suitably threaded and engages the threaded bore of an upper barrel section 11. This section is threaded at its lower end into a continuing barrel section 12. The lower end of the continuing barrel section 12 is formed with a threaded pin 13 which extends into the upper end of a main valve section 14. This section is formed with a pin 15 at its lower end which extends downwardly into the upper end of a barrel section 16 with which the upper end of a mandrel 17 telescopes. This mandrel is tubular and is threaded at its lower end into a box 18 forming a part of a packer 19. The packer is shown in Fig. 4 as being of the rat hole type, although it is understood that various other types of packers might be used, such, for example, as casing and wall packers. The upper barrel section 11 forms an inner chamber 20 to accommodate a trip valve structure. The trip valve includes a longitudinally reciprocating valve stem 21 having a central passageway 22 lengthwise of the body thereof. The upper end of the valve stem terminates in an enlarged head 23 having ducts 24 therein in communication with the central passageway 22. The ducts extend diagonally from the passageway. The enlarged head is designed to be struck by a weighted go-devil which is dropped downwardly through the drill stem to trip the valve in a manner to be hereinafter described. The stem 21 is cylindrical throughout its length and reciprocates within a valve sleeve 25 which is threaded into the upper projecting portion 26 of the continuing barrel section 12. The sleeve is formed adjacent its upper end with a counterbore 27 to receive packing 28 and into which counterbore a stuffing gland 29 is threaded. The upper end of the stuffing gland is enlarged as indicated at 30 to provide an annular seat for a lock ring 31 which circumscribes the valve stem 21 and will engage an annular lock recess 32 formed around the valve stem at a point directly beneath the head 23. This lock ring is here shown formed in two parts so that it will snap into the groove 23' immediately beneath the head 23 and hold the valve stem in its set position. Coil springs 33 are mounted in radial openings 35 in the upper end of the stuffing gland 30 and yieldably rest against the separate sections of the lock ring 31 to force it to a locked position. The springs are held in position by set screws 36. The valve sleeve 25 is formed at a point adjacent its lower end with an annular passageway 37 with which a plurality of outwardly extending radial ducts 38 communicate. The lower end of the valve sleeve is formed with a counterbore 39 with which a reversible valve seat 40 is placed to circumscribe the valve stem 21 and to form a seat for the head thereof. The lower end of this stem is fitted with a guide plunger 41 which reciprocates within a thrust sleeve 42. This sleeve is threaded at 43 to the lower end of the valve sleeve 25 and will be thus rigidly assembled therewith. The bottom of the thrust sleeve 42 is closed as indicated at 44 and provides a support for a coil spring 45 which acts between the end wall 44 of the thrust sleeve and the end face of the plunger 41 to hold the valve stem 21 in its elevated position.

The valve sleeve is rigidly held in threaded engagement with the continuing barrel section 12 as indicated at 46 and thus supports the thrust sleeve 42 in a manner to provide an annular passageway 47 around the thrust sleeve within the barrel section 12 and communicating with a passageway 48 extending downwardly through the pin 13 of the barrel section 12. The barrel section 12 is formed with a shoulder 49 which occurs directly above the radial passageways 48 communicating with the annular space 37 of the valve sleeve. In this manner fluid will at all times have an opportunity to flow upwardly into the space 47 and through the ducts 38 into the annular space 37, but will not have an opportunity to flow upwardly into the longitudinal passageway 22 through the valve stem 21 until the valve stem moves downwardly to bring radial ducts 50 into register with the annular passageway 37.

The main valve barrel 14 which is threaded on to the pin 13 of the continuing barrel section 12 is provided at its lower end with a pin 15 to which reference has been previously made. This pin is externally threaded to receive the barrel section 16 and is reduced in inside diameter from the inside diameter of the barrel section 14 to form a shoulder 51 below which the pin 15 is internally threaded on to a fixed main valve sleeve 52. This main valve sleeve carries an upwardly extending valve cage 53 which is threaded on to the upper end of the main valve sleeve and is formed with a central bore 54 to receive a spring 55. The upper end of the cage is closed by an end wall 56, the exterior of which is frustoconical to provide fluid clearance within the barrel 14. The outside diameter of the valve cage 53 is sufficiently less than the inside diameter of the main barrel section 14 as to form an annular passageway 57 which extends upwardly from the shoulder 51 and communicates through the opening 48 of the annular passageway 47 of the continuing barrel section 12. The upper end of the main valve sleeve 52 is formed with a counterbore 58 which receives a reversible valve seat 59. The valve seat fits around the cylindrical portion of a main valve stem 60 and fits around the upper end thereof to form a valve seat for an enlarged head 61 which is carried by the valve stem 60 and which reciprocates within the bore 54 of the valve cage 53. The spring 55 is interposed between the upper end of the head 61 and the end wall 56 of the cage to yieldably hold the main valve stem 60 in its lowermost position. The lower face of the head 61 is inwardly tapered to form a seal with the upper tapered face of the valve seat 59. The main valve stem 60 has a central passageway 62 therethrough which communicates with the interior of the barrel section 16 at its open lower end and is formed with an opening 63 at its upper end through which fluid may pass into the cage 53. In this manner the valve will be balanced as to fluid pressure and it will be necessary only to overcome the expansive action of spring 55 in order to lift the valve stem. At a point intermediate the ends of the main valve stem 60 a plurality of radial ducts 64 extend through the wall of the stem. These ducts normally lie within the confines of a stuffing gland 65 which is threaded into the lower end of the main valve sleeves 52 and tends to hold the packing 66 in a fluid seal position within a counterbore of the main valve sleeve 52 and around the main valve stem 60. The position of the ducts 64 with relation to the length of the main valve stem 60 is such as to insure that when the main valve stem 60 is in its uppermost position, the ducts 64 will register with an annular chamber 67 formed in the inner wall of the main valve sleeve 52 and with which outwardly extending ducts 68 communicate. These ducts are designed to provide communication between the annular chamber 67 and the annular space 57 which extends upwardly within the main valve barrel section 14 and around the valve cage 53. The lower end of the main valve stem 60 is formed with a plurality of downwardly projecting fingers 68' between which are fluid passageways 69. These fingers are designed to encounter the end face 70 of the tubular mandrel 17. The mandrel 17 is formed at its upper end with an enlarged head 71 which vertically reciprocates within the bore 72 of the barrel section 16. The face 70 is the upper end of the enlarged head 71. This head in its lowermost position engages a shoulder 73 formed within the barrel section 16 and below which shoulder the bore of the barrel is reduced in diameter as indicated at 74. The diameter of the reduced bore 74 is such as to make a sliding fit with the diameter of the main portion of the mandrel 17 below its head 71. Suitable packing 75 is positioned within the barrel 16 and around the mandrel 17 within a packing gland to form a tight seal therewith while a packing nut 76 is threaded into the lower end of the barrel 16 and holds the packing in position. This packing nut is formed integral with equalizer valve cage 77 which circumscribes the downwardly extending mandrel 17 and is formed with an annular space 78 with which ducts 79 of the mandrel may communicate when the lower barrel section 16 is in its uppermost position. Outlet ducts 80 are formed through the wall of the nut 77 and permit fluid to flow inwardly from the well into the annular space 78 and through ducts 79 into the bore within mandrel 17. The head 71 of the mandrel 17 is formed with a plurality of upwardly and outwardly diverging fluid passageways 81 which establish communication between the interior of the lower barrel section 16 and the interior of the mandrel 17. The lower end of the tubular mandrel 17 is threaded into the upper fitting 18 of a packing structure 19. This packing structure includes an upper pressure surface 82 beneath which a frusto-conical packing 83 is mounted upon a tubular packing mandrel 84. The mandrel 84 has a central passageway 85 in direct communication with the mandrel 17 and is threaded into the fitting 18. As here shown the packer is of the rat hole type. It will be understood, however, that the present device may be used with other types of packers, such as straight hole packers and hooked wall packers.

The lower end of the packer structure is fitted with a compression disc 86 held in place by a threaded coupling 87. The coupling 87 is threaded on to the lower end of the packer mandrel 84 and in turn receives the upper threaded end of a perforating nipple 88 through which fluid may flow into the testing device. The tubular mandrel 17 with its packer 19 is held in its lowermost position by an expansion spring 89 which acts between the valve member 77 and an adjusting nut 90 to yieldably hold the mandrel 17 downwardly with relation to the lower barrel section 16 as limited by the engagement of the head 71 of the mandrel 17 and the shoulder 73. The adjustment of the nut 90 determines the tension of spring 89 and the amount of weight which must be imposed upon the spring to compress the same.

In operation of the present invention the structure is assembled as shown in the drawings and it will be noted that in addition to the spring action previously described for the spring 89 to hold the barrel section 16 and the mandrel 17 in distended relation to each other, spring 55 will hold the valve stem 60 in its lowermost position at which time the ducts 64 will be closed and the spring 45 will hold the the trip valve stem 21 in its uppermost position, at which time the ducts 50 will be closed. Under such circumstances the flow of fluid upwardly through the tool and into the drill string 10 will be prevented by the main valve structure and the trip valve structure. When the tool is thus assembled and the nut 90 is adjusted to determine the degree of downward pressure, or weight necessary to cause the lower barrel section 16 to move downwardly with relation to the mandrel 17 from which it telescopes, the tool is ready for operation. It may then be lowered into a well bore through the fluid contained therein. The tension of the spring 89 will resist the action of the fluid against the packer 19 into which it is being submerged so that the tool will be maintained in its set and closed position throughout. When the packer encounters the tapered rat hole seat at the bottom of the well bore the perforating nipple 88 will extend downwardly into the rat hole. The packer 19 will thus be held against further downward movement and when weight is imposed upon the tool by the drill string, this will act through the barrel sections 11, 12, 14, and 16, to force downwardly against the spring 89 compressing the same, since the mandrel 17 will be held against movement with relation thereto. As the assembled barrel sections move downwardly, the head 71 of the mandrel 17 will move upwardly within the bore 72 of the lower barrel section 16. Attention is directed to the fact that a keyway is cut lengthwise of the head 71 as indicated at 71' and that it is engaged by a key 72 extending longitudinally of the interior wall of the member 16. In this manner the parts of the structure will be held against relative rotation. As the lower barrel section 16 moves downwardly with relation to the head 71 of the tubular mandrel 17 the lower end of the main valve stem 60 will be moved downwardly to abut against the upper end face 70 of the mandrel head 71. Attention is directed to the fact that a considerable distance occurs between the end face 70 of the mandrel head 71 and the end face of the main valve stem 60. This insures that even though the packer should accidentally encounter the side of the wall, or some obstruction as it is lowered into the hole, the mandrel may have considerable movement with relation to the barrel section 16 and without effecting the main valve stem 60, and without opening the main valve. When, however, in the course of operation of the tool the barrel structure is lowered until the main valve stem encounters the head 71 and is then further lowered, the spring 55 within the valve cage 53 will be compressed as the valve stem 60 is held against movement and the valve sleeve 52 moves downwardly with the barrel until the ducts 64 in the valve stem 60 are in register with annular space 67 in the valve sleeve, at which time fluid may flow upwardly through the main valve stem 60 and then outwardly through the ducts 64 and the ducts 68 into the circumscribing space 57 around the cage 53 and upwardly through the main barrel section 14. The fluid from below the packer will, therefore, travel upwardly through the passageway 48 in the pin 13 of the continuing barrel section 12, and then into the annular space 47 around the sleeve 42 where it will reach the ducts 38 of the trip valve sleeve 25 and flow into the longitudinal passageway within the trip valve sleeve 25 through the annular passageway 37. The fluid will be prevented from flowing into the valve stem 21 due to the fact that the valve stem is at this time in its uppermost position with the ducts sealed by the valve sleeve packing. It will be evident that a test has not yet been made. This is later accomplished by dropping a weighted instrument, such, for example, as that known to the trade as a go-devil, downwardly through the drill string 10 and into the upper end of the barrel section 11. Here the go-devil will strike the head 24 of the trip valve stem 21 and due to its weight and impact will force the trip valve stem 21 downwardly against the expansive action of spring 45. This downward movement will continue until the annular groove 32 of the valve stem moves into register with the lock ring 31. This ring has an inherent characteristic of contraction around the valve stem and when the groove 23' is in register with it, it will contract to lock the stem in its lowermost position and to hold it in this position until the tool is finally withdrawn from the well. When the valve stem has moved to its lowermost position at which point it is locked, the ducts 50 of the trip valve stem 21 will be moved to register with the annular space 37 of the trip valve sleeve 25. At this time the fluid from the annular space 47 within the continuing barrel section 12 will be free to flow inwardly through the ducts 38 to the annular space 37 within the trip valve sleeve 25 and then through ducts 50 into the valve stem 21. The fluid will flow upwardly through the passage 22 in the valve stem and then outwardly through ducts 24 in the head 23 of the valve stem and into the upper barrel section 11. This upward flow will continue into the drill string 10, the point it reaches being determined by the pressure of the fluid within the formation and within the rat hole below the packer 19. The operator may readily ascertain when an uprush of fluid has discontinued within the drill stem through the testing tool by covering the upper opened end of the drill string 10 with a damp cloth to make a temporary fluid seal so that the upward movement of gas and air within the drill string will tend to raise this cloth and indicate the activity of the fluid moving into the drill string. After a suitable test has been made and a suitable sample has been obtained, the drill string may be lifted. This will relieve the weight upon the testing tool so that its assembled barrel section, including the members 11, 12, 14, and 16, will move upwardly with relation to the tubular mandrel 17 until the head 71 of the mandrel 17 engages the shoulder 73 in the reduced portion of the bore 74 of the lower barrel section 16. When this condition prevails, the ducts 79 of the tubular mandrel 17 will be in register with the passage 78 of the equalizer valve nut 76. At the same time a free flow of fluid may be had through the ducts 80. This condition of circulation is initiated just prior to the time that the barrel structure acting through the shoulder 73 begins to pull upwardly on the tubular mandrel 17 to break the seal established between the packer 19 and its seat. It will be appreciated that at this time the entire weight and pressure of the fluid column within the well is resting upon the packer, and that it would require an enormous tension to pull the packer loose from its seat. With the equalizer valve structure, however, in the position shown in Fig. 4, so that the fluid pressure above the packer and the fluid pressure below the packer may be equalized through the ducts and passageways 78 and 78, and 80, it is possible to establish an equilibrium of pressure above the fluid column through the packer and below the fluid column. Under such circumstances the packer may be readily withdrawn from its seat.

Attention is also directed to the fact that the main valve structure, including the main valve stem 60, is balanced with regards to fluid pressure, since fluid may move freely upwardly through the valve stem 60 and into the cage 53. This insures that the only pressure which is necessary to overcome in opening the main valve is pressure required to compress the spring 55, and the spring 89, and that when this pressure is relieved, the spring 55 will restore the main valve to its closed position. This arrangement is of considerable importance since in various types of testers valves have been used which had to be operated against the entire pressure of the column of fluid within the well. By the present arrangement ease of operation of the entire structure is insured and thus the accuracy of the test will be greater than that obtained by most testers now known.

It will thus be seen that the formation tester here disclosed embodies the use of valves which require reciprocation of the drill string only, and which insure that the valve will be positively opened and when required positively closed whereby the test may be made with certainty, even though the tool is disposed at a remote point from the position of the operator and even though the tool is submerged at a great depth within a column of fluid having an appreciable hydro-static pressure.

While I have shown the preferred form of my invention, as now known to me, it will be understood that various changes might be made in the combination, construction, and arrangement of parts, by those skilled in the art, without departing from the spirit of the invention as claimed.

Having thus described my invention, what I claim and desire to secure by Letters Patent is:

1. A formation tester adapted to be lowered into a well bore while supported upon a drill string, said drill string acting to receive a fluid sample from the formation, a barrel rigidly secured to the lower end of said drill string, a mandrel slidable within the lower end of the barrel, means limiting the downward movement of the mandrel within the barrel and whereby the mandrel may be lifted with the barrel, a packer carried upon the mandrel, said mandrel and packer being formed with a longitudinal passageway communicating with the barrel, spring means acting to yieldably maintain the mandrel in its lowermost position with relation to the barrel, a main valve structure mounted within the barrel and adapted to control the upward flow of fluid therethrough, said valve including a valve sleeve fixed with relation to the barrel, and a valve stem longitudinally movable within the sleeve, the lower end of the valve stem being disposed in a position to encounter the upper end of the mandrel when the mandrel moves into the barrel whereby to open the valve, spring means acting to maintain said valve closed when the pressure delivered by the mandrel is relieved from the valve stem, a trip valve mounted within the barrel above the main valve and independently thereof, said valve comprising a ported sleeve fixed within the barrel and a slidable valve stem mounted therein, spring means normally holding the valve in its closed position and adapted to permit the valve to open when a weighted member is dropped through the drill stem, and means automatically locking the valve in its opened position.

2. In a device of the character described, a valve sleeve having a central passageway therethrough, a tubular valve stem therein, a spring within said valve sleeve normally holding the valve stem in its outermost position, ports formed through the wall of the valve stem and normally closed when the stem is in its outermost position within the valve sleeve, ports through the wall of the valve sleeve and with which the ports in the valve stem communicate when the valve stem is moved to its innermost position, and lock means carried by the valve sleeve acting to engage the valve stem for locking the valve stem in position when its ports have moved into communication with the ports of the valve sleeve.

3. In a device of the character described, a valve sleeve having a central passageway therethrough, a tubular valve stem therein, spring means normally holding the valve stem in its outermost position, ports formed through the wall of the valve stem and normally closed when the valve stem is in its outermost position within the valve sleeve ports through the wall of the valve sleeve and with which the ports in the valve stem communicate when the valve stem is moved to its innermost position, means for locking the valve stem in position with its ports in communication with the ports of the valve sleeve, a thrust sleeve attached to the lower end of the valve sleeve and closed at its lower end, the cavity therein being in communication with the central tubular passageway through the valve stem whereby fluid pressure will equalize above and below the valve stem to permit its free downward movement.

4. In a device of the character described, a trip valve comprising an outer housing through which fluid might normally flow, a valve sleeve interposed at a point in the length of said housing, a thrust sleeve secured at the lower end of the valve sleeve within the housing, said thrust sleeve having a closed lower end, a tubular valve stem reciprocating vertically within the valve sleeve and establishing communication between the upper end of the housing and the interior of the thrust sleeve, a guide plunger carried at the lower end of the valve stem and sliding within the thrust sleeve, a valve spring disposed within the thrust sleeve and acting to hold the valve stem in its outermost position, packing means creating a fluid excluding seal between the valve sleeve and the valve stem, ports formed through the wall of the valve stem and normally closed when the valve stem is in its outermost position, ports formed through the wall of the valve sleeve and communicating with the interior of the housing below the valve sleeve and with which the ports of the valve stem communicate when the valve stem is in its innermost position, whereby a fluid passageway will be established from the area above the valve sleeve to the area below the valve sleeve within the housing and through the central passageway of the valve stem and the registering ports, and lock means carried by the sleeve acting to engage the valve stem when it has moved to bring the valve ports into register and to thus hold the same.

5. A well tester comprising a barrel supported at the lower end of a tubular suspending member and in communication therewith, a tubular mandrel mounted at the lower end and within said barrel for longitudinal sliding motion relative thereto, a well packer carried by said mandrel and having a passageway central thereof whereby fluid from below the well packer may pass upwardly through the mandrel and into the barrel, means yieldably holding the mandrel in its lowermost position with relation to the barrel, a balanced valve structure comprising a valve and its stem mounted within the barrel and hydrostatically balanced by the fluid delivered thereto through the mandrel, said valve stem cooperating with the mandrel upon collapsing movement of the mandrel and the barrel to open said valve.

6. Same as in claim 5, and with the addition of said valve stem permitting a pre-determined amount of longitudinal movement between the barrel and the mandrel before acting upon the valve.

MORDICA O. JOHNSTON.